(12) United States Patent
Lee et al.

(10) Patent No.: US 9,250,124 B2
(45) Date of Patent: Feb. 2, 2016

(54) LASER PATTERNING EXAMINING APPARATUS

(71) Applicants: Seok-Joo Lee, Yongin (KR); Jin-Hong Jeun, Yongin (KR)

(72) Inventors: Seok-Joo Lee, Yongin (KR); Jin-Hong Jeun, Yongin (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 241 days.

(21) Appl. No.: 13/920,266

(22) Filed: Jun. 18, 2013

(65) Prior Publication Data

US 2014/0168639 A1 Jun. 19, 2014

(30) Foreign Application Priority Data

Dec. 13, 2012 (KR) .................. 10-2012-0145714

(51) Int. Cl.
*G01J 1/04* (2006.01)
*G01J 1/42* (2006.01)
*G01J 1/02* (2006.01)

(52) U.S. Cl.
CPC ............. *G01J 1/4257* (2013.01); *G01J 1/0252* (2013.01); *G01J 1/0414* (2013.01); *G01J 1/0448* (2013.01); *G01J 1/0477* (2013.01)

(58) Field of Classification Search
USPC ........................................................ 356/121
See application file for complete search history.

(56) References Cited

U.S. PATENT DOCUMENTS

| | | | | |
|---|---|---|---|---|
| 3,981,574 A * | 9/1976 | Jesensky et al. | | 353/101 |
| 3,983,317 A * | 9/1976 | Glorioso | | 369/109.01 |
| 4,667,316 A * | 5/1987 | Suda et al. | | 369/44.38 |
| 4,771,414 A * | 9/1988 | Yoshimatsu | | 369/110.04 |
| 5,077,723 A * | 12/1991 | Yoshimatsu | | G11B 7/08 369/110.02 |
| 5,095,473 A * | 3/1992 | Gotoh | | G11B 7/094 369/44.14 |
| 5,192,870 A * | 3/1993 | Batchelder | | G01N 15/0205 250/574 |
| 5,272,685 A * | 12/1993 | Ando | | G02B 5/04 359/485.03 |
| 5,568,457 A * | 10/1996 | Yang | | G11B 7/0943 369/110.02 |
| 5,672,880 A * | 9/1997 | Kain | | G02B 21/16 250/458.1 |
| 6,657,216 B1 * | 12/2003 | Poris | | G01B 11/0608 250/216 |
| 6,792,017 B2 * | 9/2004 | Halpin | | 372/35 |
| 7,009,141 B1 * | 3/2006 | Wool et al. | | 219/121.73 |
| 7,027,381 B1 * | 4/2006 | Nagasaka | | G03F 7/001 369/275.1 |
| 7,295,305 B2 * | 11/2007 | Yoshida | | G01N 21/4788 356/237.5 |
| 2002/0001403 A1 * | 1/2002 | Kikuchi | | 382/145 |
| 2002/0024714 A1 * | 2/2002 | Sandstrom et al. | | 359/290 |
| 2004/0109591 A1 * | 6/2004 | McClurg | | G06K 9/00046 382/127 |

FOREIGN PATENT DOCUMENTS

| | | | |
|---|---|---|---|
| JP | 2001338893 A | 12/2001 | |
| KR | 10-2005-0018186 A | 2/2005 | |
| KR | 10-2011-0070265 A | 6/2011 | |

* cited by examiner

*Primary Examiner* — Gregory J Toatley
*Assistant Examiner* — Jarreas C Underwood
(74) *Attorney, Agent, or Firm* — Lee & Morse, P.C.

(57) ABSTRACT

A laser patterning examining apparatus includes a fixing plate, a rotating plate configured to move vertically with respect to the fixing plate and to rotate, a housing connected to the rotating plate, a laser emission unit over the fixing plate and emits a laser beam, a prism unit on the housing and refracts a first portion of the laser beam received from the laser emission unit and transmits a second portion of the laser beam, and a beam profiler on the housing and analyzes the pattern of the first portion refracted by the prism unit.

18 Claims, 9 Drawing Sheets

LASER PATTERNING EXAMINING APPARATUS

CROSS-REFERENCE TO RELATED APPLICATION

This application claims the benefit of Korean Patent Application No. 10-2012-0145714, filed on Dec. 13, 2012, in the Korean Intellectual Property Office, the disclosure of which is incorporated herein in its entirety by reference.

BACKGROUND

1. Field

Embodiments relate to a laser patterning examining apparatus.

2. Description of the Related Art

Mobile electronic apparatuses, including tablet personal computers and small electronic devices, e.g., mobile phones, are in wide use. To support various functions, such mobile electronic apparatuses include a display unit for providing visual information, such as an image, to users. With a recent trend toward miniaturization of other components for driving a display unit, the importance of the display unit to electronic apparatuses is gradually increasing, and a display unit which is flat, but still bendable at predetermined angles, is under development.

Such a display unit may be formed via various processes. To form this display unit, an organic electro-luminescent (EL) layer may be formed by transferring an organic material via laser transfer patterning. In this laser transfer patterning, since successful formation of an organic EL layer may be determined by the pattern of a laser beam, examination of a laser beam pattern is necessary before performing laser transfer patterning.

SUMMARY

One or more embodiments are directed to providing a laser patterning examining apparatus including: a fixing plate; a rotating plate configured to move vertically with respect to the fixing plate and to rotate; a housing connected to the rotating plate; a laser emission unit above the fixing plate and emits a laser beam; a prism unit on the housing and refracts a first portion of the laser bean received from the laser emission unit and transmits a second portion; and a beam profiler installed on the housing and analyzes the pattern of the first portion refracted by the prism unit.

The prism unit may be installed to move the housing vertically.

The prism unit may include a prism; and a prism installation unit on which the prism is installed.

The prism unit may further include a first up-and-down distance adjustment unit which is coupled to the prism installation unit and moves the prism installation unit perpendicular to the housing.

The laser patterning examining apparatus may further include a mirror unit which is installed under the prism unit and reflects the part of the laser transmitted by the prism unit.

The laser patterning examining apparatus may further include a mirror forward-backward movement driving unit which is connected to the mirror unit and moves the mirror unit back and forth.

The laser patterning examining apparatus may further include a beam duct which dissipates a laser reflected by the mirror unit.

The beam duct may include a coolant circulation unit which is installed inside the beam duct and circulates a coolant to dissipate the laser beam.

The laser patterning examining apparatus may further include a first linear motion (LM) guide unit which is installed between the rotating plate and the housing.

The laser patterning examining apparatus may further include a second up-and-down distance adjustment unit which is installed between the fixing plate and the rotating plate and adjusts an up-and-down distance between the fixing plate and the rotating plate.

The laser patterning examining apparatus may further include a housing front-and-back distance adjustment unit which is installed between the rotating plate and the housing and adjusts a front-and-back distance between the rotating plate and the housing.

The beam profiler may be installed to linearly move on the housing.

The laser patterning examining apparatus may further include a driving unit which is installed on the housing and linearly moves the beam profiler.

The prism unit may be connected to the driving unit and linearly move together with the beam profiler.

The laser patterning examining apparatus may further include a second LM guide unit which is installed between the driving unit and the housing and guides the linear motion of the prism unit.

The laser patterning examining apparatus may further include a manual stage which is installed between the driving unit and the beam profiler and moves the beam profiler up and down or back and forth.

The manual stage may include a first manual stage which moves the beam profiler perpendicular to the driving unit; and a second manual stage which moves the beam profiler parallel to the driving unit.

The laser patterning examining apparatus may further include a rotation adjustment unit which is installed between the fixing plate and the rotating plate and rotates the rotating plate with respect to the fixing plate.

The rotation adjustment unit may include a support bracket which is installed on the fixing plate; an adjustment bracket which penetrates the fixing plate and is installed on the rotating plate; and an interval adjustment unit which is inserted into the support bracket and the adjustment bracket and adjusts an interval between the support bracket and the adjustment bracket.

The rotation adjustment unit may further include an elastic unit which is installed between the support bracket and the adjustment bracket.

The laser patterning examining apparatus may further include a prism cooling unit which is separated from the beam profiler by a predetermined distance.

BRIEF DESCRIPTION OF THE DRAWINGS

The above and other features and advantages will become more apparent by describing in detail exemplary embodiments thereof with reference to the attached drawings in which.

DETAILED DESCRIPTION

Embodiments will now be described more fully with reference to the accompanying drawings, in which exemplary embodiments are shown. These embodiments may, however, be embodied in many different forms and should not be construed as being limited to the embodiments set forth herein; rather, these embodiments are provided so that this disclosure will be thorough and complete, and will fully convey concepts to those skilled in the art. The terminology used herein is for the purpose of describing particular embodiments only and is not intended to be limiting. As used herein, the singular forms "a", "an" and "the" are intended to include the plural forms as well, unless the context clearly indicates otherwise. It will be understood that the terms "comprises" and/or "comprising," when used in this specification, specify the presence of stated components, steps, operations, and/or elements thereof, but do not preclude the presence or addition of one or more other components, steps, operations, and/or elements thereof. While such terms as "first," "second," etc., may be used to describe various components, such components must not be limited to the above terms. The above terms are used only to distinguish one component from another. Expressions such as "at least one of," when preceding a list of elements, modify the entire list of elements and do not modify the individual elements of the list.

Figure 1:
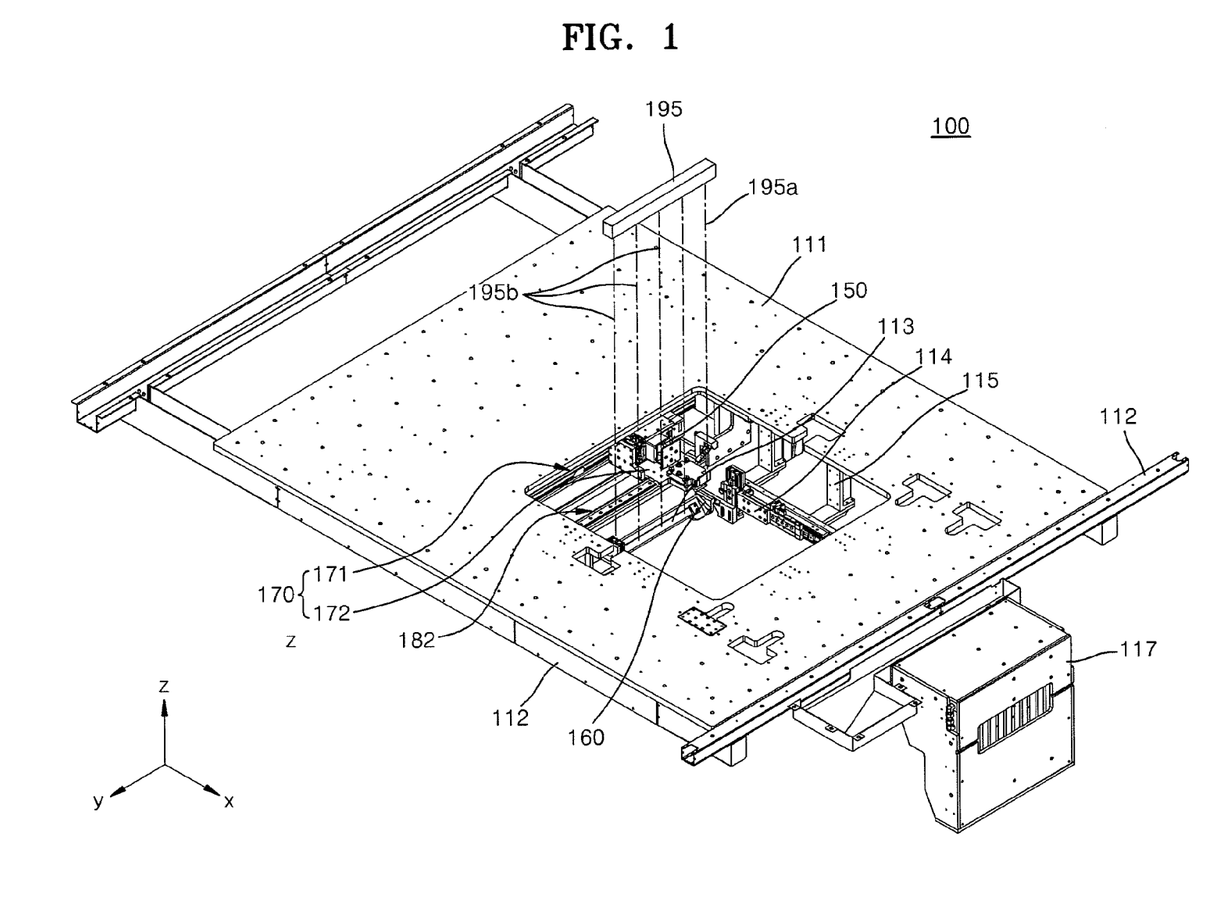
FIG. 1 is a perspective view of a laser patterning examining apparatus according to an embodiment.
Figure 2:
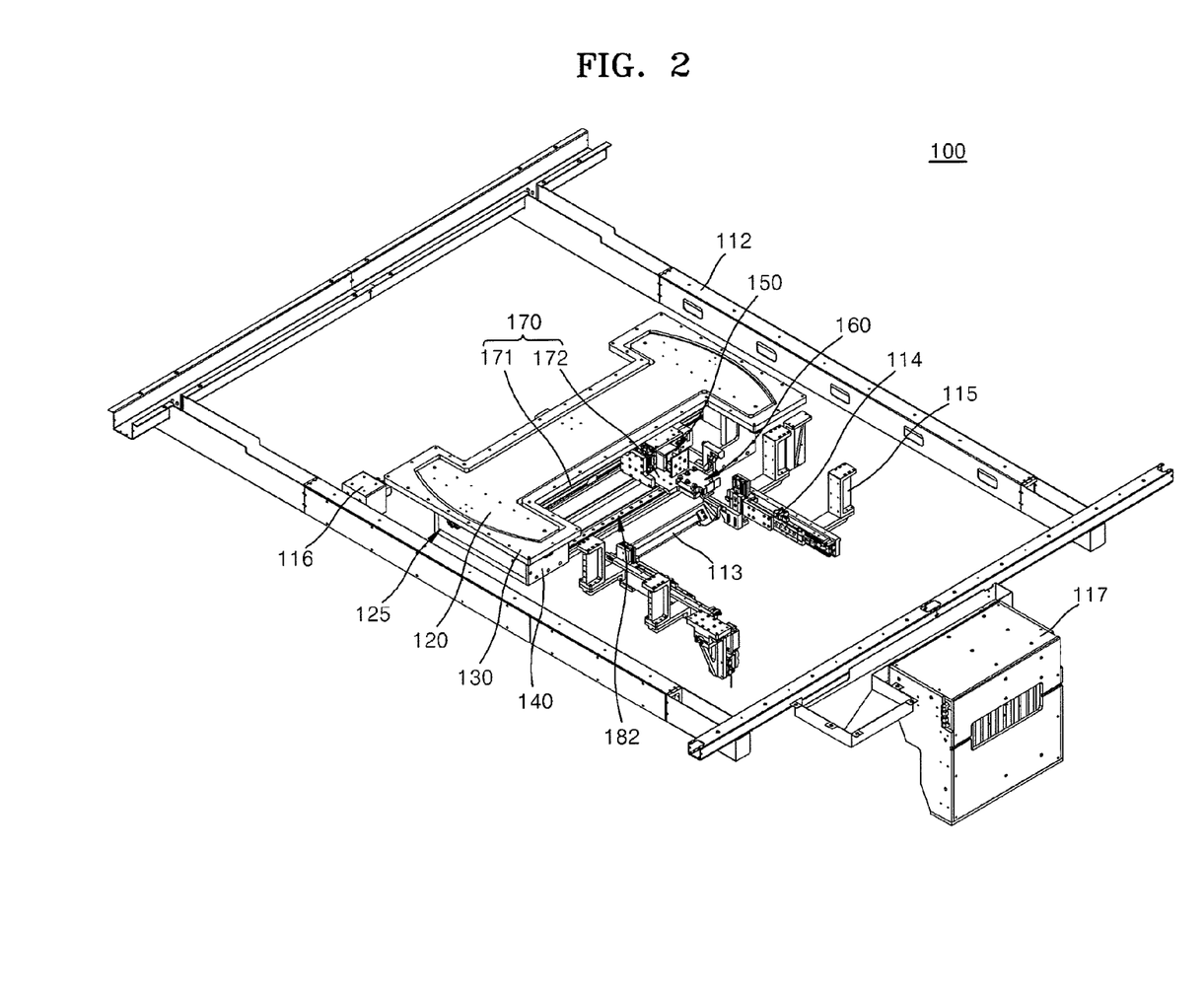
FIG. 2 is a perspective view of the laser patterning examining apparatus of FIG. 1 from which an upper plate has been removed.

FIG. 1 is a perspective view of a laser patterning examining apparatus 100 according to an embodiment. FIG. 2 is a perspective view of the laser patterning examining apparatus 100 from which an upper plate 111 has been removed.

Referring to FIGS. 1 and 2, the laser patterning examining apparatus 100 may include the upper plate 111. The upper plate 111 may be connected to and fixed to an external fixing plate 130. A slate (not shown) may be installed on an upper surface of the upper plate 111. In particular, various devices may be installed on the slate. For example, a laser emission unit 195, which will be described later, may be installed on the slate. Various cables, a driving motor, and the like may also be installed on the slate.

The laser patterning examining apparatus 100 may include a cable duct 112 installed so as to be fixed to the upper plate 111. The cable duct 112 receives various cables and various wires, and may be formed in a lattice shape and fixed to the upper plate 111.

The laser patterning examining apparatus 100 may also include a mirror unit 113 disposed on a lower surface of the upper plate 111. The mirror unit 113 may reflect a laser beam that passes through a prism unit 160, which will be described later, at a predetermined angle.

The laser patterning examining apparatus 100 may include a mirror forward-backward movement driving unit 114, which moves the mirror unit 113 forwards and backwards. The mirror forward-backward movement driving unit 114 may automatically move the mirror unit 113 forwards and backwards by using a separate driving unit included therein, and may manually move the mirror unit 113 forwards and backwards by using a third linear motion (LM) guide (not shown) included therein. The mirror unit 113 may move linearly in a lengthwise direction, i.e., along an x-axis direction, of the upper plate 111 by means of the mirror forward-backward movement driving unit 114.

The laser patterning examining apparatus 100 may include a first fixing bracket 115, which fixes the mirror unit 113 and the mirror forward-backward movement driving unit 114 to the upper plate 111. A plurality of the first fixing brackets 115 may be included. The first fixing brackets 115 may be arranged at predetermined locations on the upper plate 111 to support the mirror unit 113 and the mirror forward-backward movement driving unit 114.

The laser patterning examining apparatus 100 may include a beam duct 117, which is disposed apart from the mirror unit 113 by a certain distance and absorbs a laser reflected by the mirror unit 113. The beam duct 117 may be fixed to the upper plate 111. The beam duct 117 may include a coolant circulation unit (not shown) that circulates a coolant in order to dissipate heat from an incident laser beam.

The laser patterning examining apparatus 100 may include a brake switch 116 installed so as to be fixed to the upper plate 111. The brake switch 116 may be a switch for braking an action of the laser patterning examining apparatus 100 when an emergency situation or the like occurs.

The other components of the laser patterning examining apparatus 100 will now be described.

Figure 3:
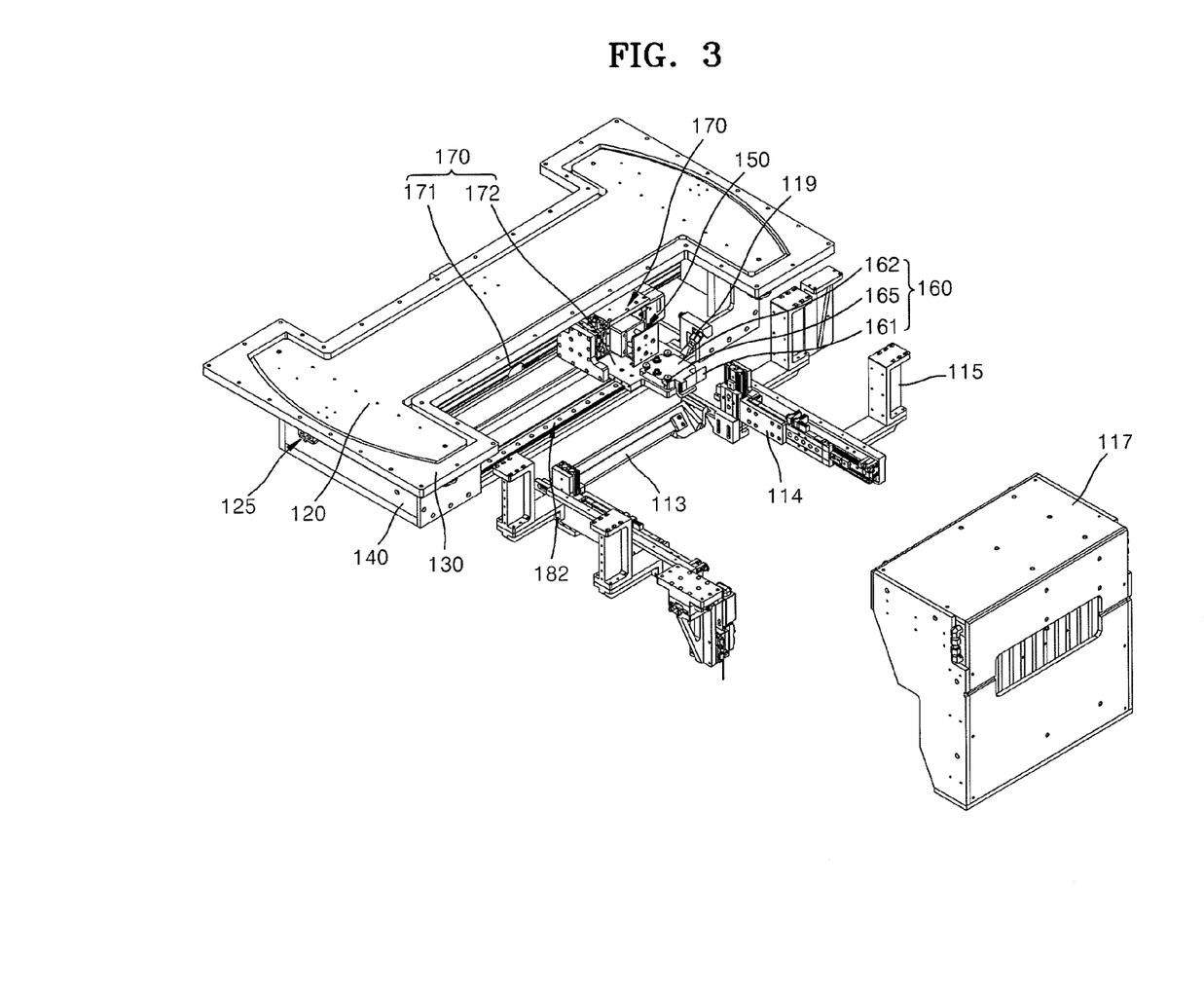
FIG. 3 is a perspective view of a part of the laser patterning examining apparatus illustrated in FIG. 2.
Figure 4:
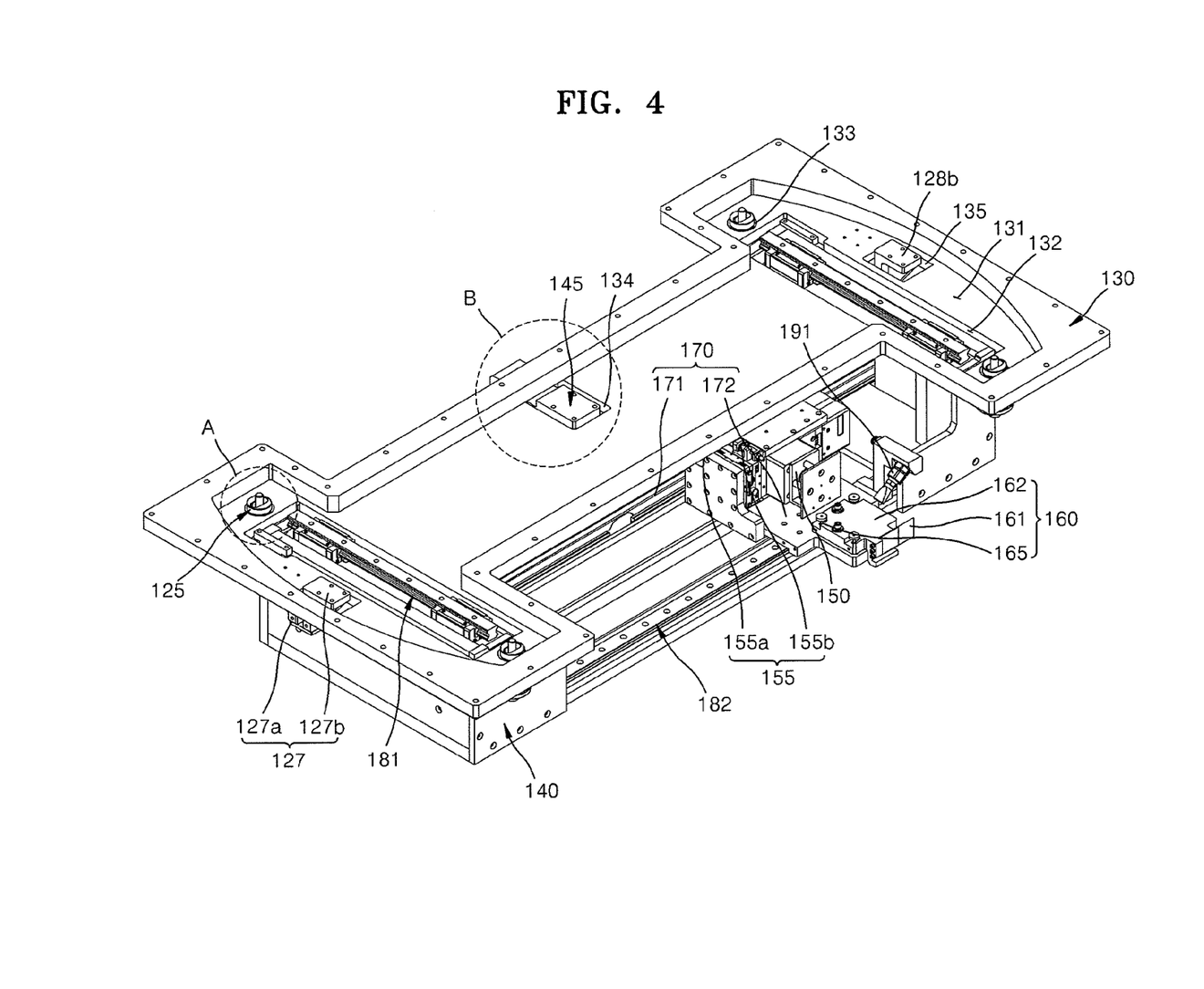
FIG. 4 is a perspective view of the laser patterning examining apparatus of FIG. 3 from which a rotating plate has been removed.
Figure 5:
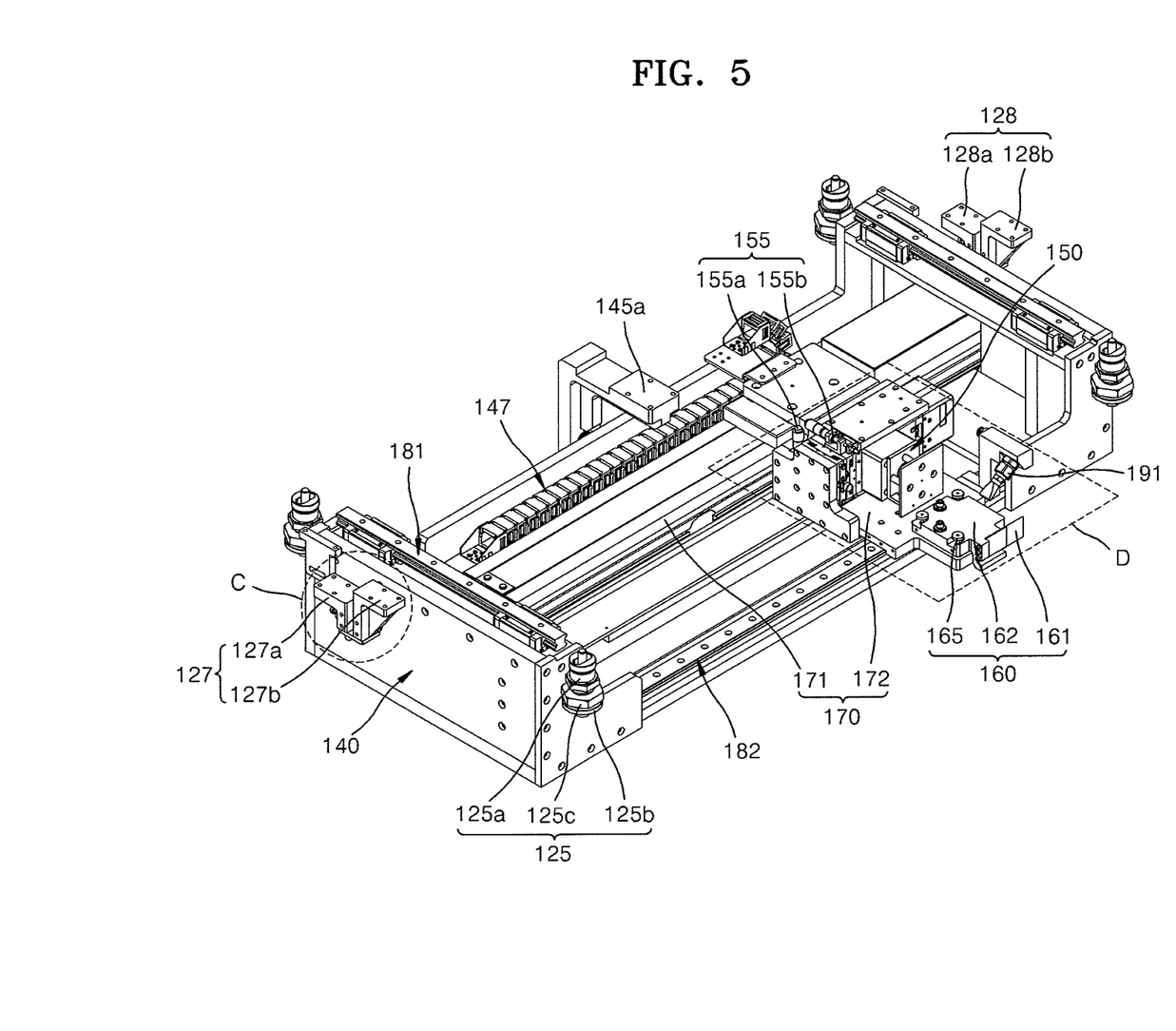
FIG. 5 is a perspective view of the laser patterning examining apparatus of FIG. 3 from which a fixing plate has been removed.

FIG. 3 is a perspective view of a part of the laser patterning examining apparatus 100 illustrated in FIG. 2. FIG. 4 is a perspective view of the laser patterning examining apparatus 100 illustrated FIG. 3 from which a rotating plate 120 has been removed. FIG. 5 is a perspective view of the laser patterning examining apparatus 100 illustrated in FIG. 3, from which the fixing plate 130 has been removed.

Referring to FIGS. 3-5, the laser patterning examining apparatus 100 may include the fixing plate 130. The fixing plate 130 may be installed to be connected to the upper plate 111. In particular, the fixing plate 130 may be connected to the upper plate 111 via welding or by using a bolt or the like.

A rotating plate insertion groove 131, onto which the rotating plate 120, which will be described later, fits, may be formed on the fixing plate 130. In particular, the rotating plate insertion groove 131 may be indented downwards, i.e., along a z-axis, from the upper surface of the fixing plate 130.

A first insertion hole 132 may be formed in the fixing plate 130 so that a first LM guide unit 181, which will be described later, is inserted into the first insertion hole 132. A second insertion hole 133, into which a second up-and-down distance adjustment unit 125, which will be described later, is inserted, may be formed in the fixing plate 130, and a third insertion hole 134, into which a housing front-and-back distance adjustment unit 145, which will be described later, is inserted, may be formed in the fixing plate 130. A fourth insertion hole 135, into which a second adjustment bracket 128b, which will be described later, is inserted, may be formed in the fixing plate 130.

The rotating plate insertion groove 131 and the first through fourth insertion holes 132 through 135 may be formed to be wider than the respective outer circumference surfaces of components which are respectively inserted into the first through fourth insertion holes 132 through 135. In detail, the rotating plate insertion groove 131 and the first through fourth insertion holes 132 through 135 may be formed to be wide enough to avoid interference between the rotating plate 120 and the fixing plate 130 during a relative motion between the rotating plate 120 and the fixing plate 130.

The laser patterning examining apparatus 100 may include the rotating plate 120, which is fitted onto the fixing plate 130. The rotating plate 120 may be fitted onto the rotating plate insertion groove 131 so as to be apart from the outer surface of the fixing plate 130 by a predetermined distance.

The laser patterning examining apparatus 100 may include a housing 140 installed to be connected to the rotating plate 120. The housing 140 and the rotating plate 120 may be connected to each other via various components.

In particular, the first LM guide unit 181 may be installed between the housing 140 and the rotating plate 120 to connect the housing 140 and the rotating plate 120 to each other. The first LM guide unit 181 may be installed to penetrate the fixing plate 130 via the first insertion hole 132 and, thus, may be connected to the rotating plate 120. Since the first LM guide unit 181 is the same as a general LM guide, a detailed description thereof is omitted. A cable veyor 147, into which a cable is inserted, may be installed on the housing 140. The cable veyor 147 may be movably installed on the housing 140.

The housing 140 and the rotating plate 120, which are installed as described above, may make a relative forward-and-backward movement. During a forward-and-backward motion of the housing 140, the first LM guide unit 181 may support the housing 140 while guiding the forward-and-backward motion of the housing 140.

The laser patterning examining apparatus 100 may include a prism unit 160, which is installed on the housing 140 and which refracts a part of a laser beam, i.e., a first portion 195a, received from the laser emission unit 195 and transmits the remaining part, i.e., a second portion 195b, thereof.

The prism unit 160 may refract only the first portion 195a of a patterned laser beam toward a beam profiler 150. For example, when the prism unit 160 receives a patterned laser beam having a width of 260 mm from the laser emission unit 195, the prism unit 160 may refract only a part of the patterned laser beam, e.g., a laser beam having a width of 30 mm, toward the beam profiler 150 and may transmit the remaining part of the patterned laser beam, e.g., a laser beam having a width of 230 mm. Accordingly, the prism unit 160 may refract only a laser beam having a width that can be measured by the beam profiler 150. However, the above-described laser width is only an example, so embodiments are not limited thereto. Various laser widths may be measured.

The prism unit 160 may be installed on the housing 140 so as to move vertically, i.e., along the z-axis. The prism unit 160 may include a prism 161 and a prism installation unit 162, on which the prism 161 is installed. In particular, the prism 161 may be installed to make a predetermined angle with one surface of the prism installation unit 162 and thus may refract a part of a laser beam received from the laser emission unit 195.

The prism unit 160 may also include a first up-and-down distance adjustment unit 165, which connects a connection plate 172, which is to be described later, to the prism installation unit 162 and adjusts an interval between the connection plate 172 and the prism installation unit 162.

In detail, the first up-and-down distance adjustment unit 165 may be formed in a bolt shape and rotate in order to adjust the interval between the prism installation unit 162 and the connection plate 172. In particular, the first up-and-down distance adjustment unit 165 may be installed so as to penetrate the prism installation unit 162, and may be installed so that one end of the first up-and-down distance adjustment unit 165 is inserted into and supported by the connection plate 172. Accordingly, the first up-and-down distance adjustment unit 165 may adjust the interval between the prism installation unit 162 and the connection plate 172 via rotation.

The prism unit 160 may include a plurality of the first up-and-down distance adjustment units 165. In particular, the first up-and-down distance adjustment units 165 may be adjusted equally or differently to adjust the location of the prism 161.

The laser patterning examining apparatus 100 may include the beam profiler 150, which is installed on the housing 140 and analyzes the pattern of the laser beam refracted by the prism unit 160. The beam profiler 150 may linearly move on the housing 140. Since the beam profiler 150 is similar to general equipment for analyzing a laser pattern, a detailed description thereof is omitted.

The laser patterning examining apparatus 100 may include a driving unit 170, which is installed on the housing 140 and linearly moves the beam profiler 150. The driving unit 170 may include an actuator 171, which is installed on the housing 140 and linearly moves, i.e., along the y-axis. The driving unit 170 may further include the connection plate 172, which is connected to the actuator 171 and the prism unit 160. The connection plate 172 may be installed on the actuator 171 so as to extend from the beam profiler 150.

The laser patterning examining apparatus 100 may include a second LM guide unit 182, which is installed between the driving unit 170 and the housing 140 and guides a linear motion, i.e., along the y-axis, of the prism unit 160. In detail, the second LM guide unit 182 may be installed between the connection plate 172 and the housing 140.

The laser patterning examining apparatus 100 may include a manual stage 155 installed between the driving unit 170 and the beam profiler 150. The manual stage 155 may make the beam profiler 150 move up and down or back and forth.

In detail, the manual stage 155 may include a first manual stage 155a, which vertically moves, i.e., along the z-axis, the beam profiler 150 with respect to the driving unit 170. The manual stage 155 may further include a second manual stage 155b, which moves the beam profiler 150 back and forth, i.e., along the x-axis, with respect to the driving unit 170.

The laser patterning examining apparatus 100 may include a second up-and-down distance adjustment unit 125, which is installed between the fixing plate 130 and the rotating plate 120. The second up-and-down distance adjustment unit 125 may adjust an up-and-down distance between the fixing plate 130 and the rotating plate 120.

A plurality of the second up-and-down distance adjustment units 125 may be included, and may be installed on both ends of the rotating plate 120 so as to face each other. The second up-and-down distance adjustment unit 125 may include a second up-and-down distance adjustment bolt 125a, which penetrates the fixing plate 130 and is partially inserted into the rotating plate 120. The second up-and-down distance adjustment unit 125 may further include a second fixing bolt 125b, which is installed to fit into the second up-and-down distance adjustment bolt 125a and fixes the second up-and-down distance adjustment bolt 125a. The second up-and-down distance adjustment unit 125 may further include a second fixing nut 125c, which is installed on at least one of an upper surface of the fixing plate 130 and a head side of the second up-and-down distance adjustment bolt 125a, and is coupled to the second fixing bolt 125b.

The laser patterning examining apparatus 100 may include the housing front-and-back distance adjustment unit 145, which is installed between the rotating plate 120 and the housing 140 and adjusts a front-and-back distance between the rotating plate 120 and the housing 140.

The housing front-and-back distance adjustment unit 145 may include the second fixing bracket 145a, which penetrates the fixing plate 130 and is fixed to the rotating plate 120. The housing front-and-back distance adjustment unit 145 may further include a third fixing bolt 145b, which is inserted into the second fixing bracket 145a and is installed so that one end is inserted into the housing 140. A third fixing nut (not shown) for fixing the third fixing bolt 145b may be installed in the second fixing bracket 145a.

The laser patterning examining apparatus 100 may include rotation adjustment units 127 and 128, which are installed between the fixing plate 130 and the rotating plate 120 and rotate the rotating plate 120 with respect to the fixing plate 130.

The rotation adjustment units 127 and 128 may include support brackets 127a and 128a, respectively, installed on the fixing plate 130. The rotation adjustment units 127 and 128 may further include adjustment brackets 127b and 128b, respectively, installed on the fixing plate 130. The adjustment brackets 127b and 128b may be installed to penetrate the fixing plate 130.

The rotation adjustment units 127 and 128 may further include interval adjustment units (not shown), respectively, which are inserted into the support brackets 127a and 128a and the adjustment brackets 127b and 128b so as to adjust the interval between the support bracket 127a and the adjustment bracket 127b and the interval between the support bracket 128a and the adjustment bracket 128b. The interval adjustment units may include interval adjustment bolts (not shown), respectively, which are installed to penetrate the support brackets 127a and 128a and the adjustment brackets 127b and 128b, and interval adjustment nuts (not shown), respectively, which are installed on outer surfaces of the support brackets 127a and 128a and into which the interval adjustment bolts are inserted.

The rotation adjustment units 127 and 128 may further include elastic units (not shown), respectively, installed between the support bracket 127a and the adjustment bracket 127b, and between the support bracket 128a and the adjustment bracket 128b. The interval adjustment bolts may fit into the elastic units, respectively.

A plurality of the rotation adjustment units 127 and 128 may be included. For example, the rotation adjustment units 127 and 128 may include a first rotation adjustment unit 127, and a second rotation adjustment unit 128, which are installed to be symmetrical to the first rotation adjustment unit 127. The first rotation adjustment unit 127 may be the same as the second rotation adjustment unit 128.

In particular, the first rotation adjustment unit 127 may include a first support bracket 127a, a first adjustment bracket 127b, a first interval adjustment bolt (not shown), a first interval adjustment nut (not shown), and a first elastic unit (not shown). The second rotation adjustment unit 128 may include a second support brackets 128a, a second adjustment bracket 128b, a second interval adjustment bolt (not shown), a second interval adjustment nut (not shown), and a second elastic unit (not shown).

The laser patterning examining apparatus 100 may include a prism cooling unit 191, installed apart, i.e., separated, from the beam profiler 150 by a predetermined distance. The prism cooling unit 191 may control the temperature of the prism unit 160 by supplying air to the prism unit 160. In particular, the prism cooling unit 191 may prevent the temperature of the prism 161 from increasing by supplying air directly to the prism 161.

An operation and an alignment method of the laser patterning examining apparatus 100 will now be described in detail.

Figure 6:
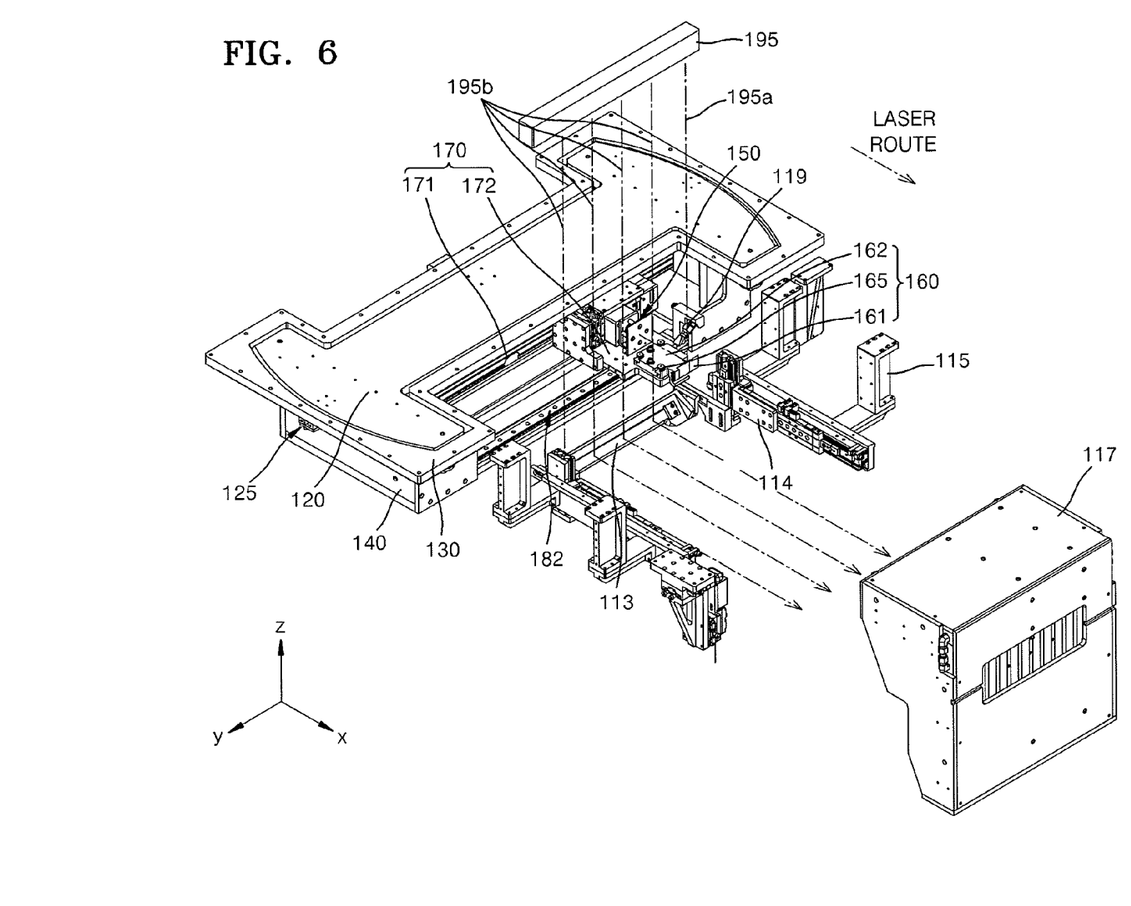
FIG. 6 is a perspective view that illustrates a direction in which a laser proceeds in the laser patterning examining apparatus illustrated in FIG. 3.
Figure 7:
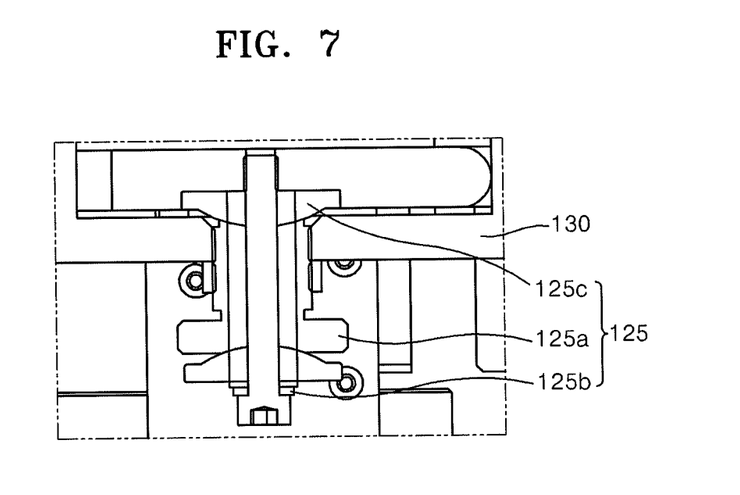
FIG. 7 is a cross-sectional view of an enlargement of a part A of the laser patterning examining apparatus illustrated in FIG. 4.
Figure 8:
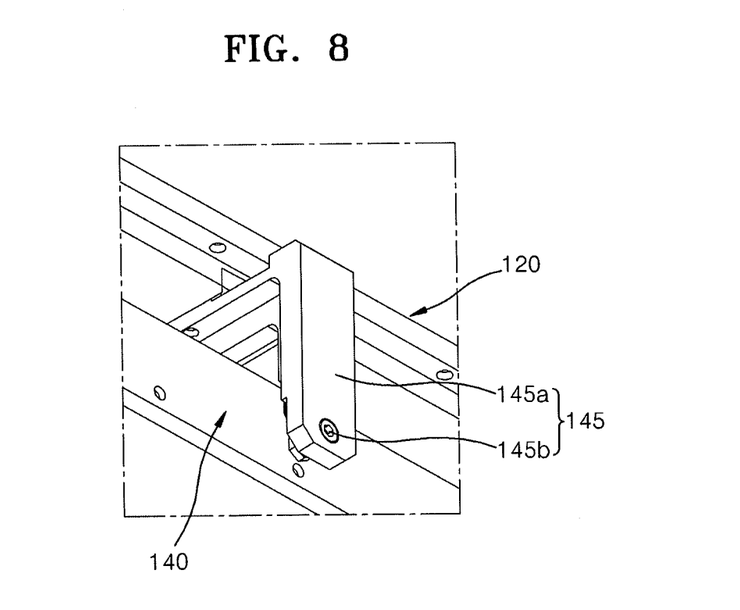
FIG. 8 is a perspective view of an enlargement of a part B of the laser patterning examining apparatus illustrated in FIG. 4.
Figure 9:
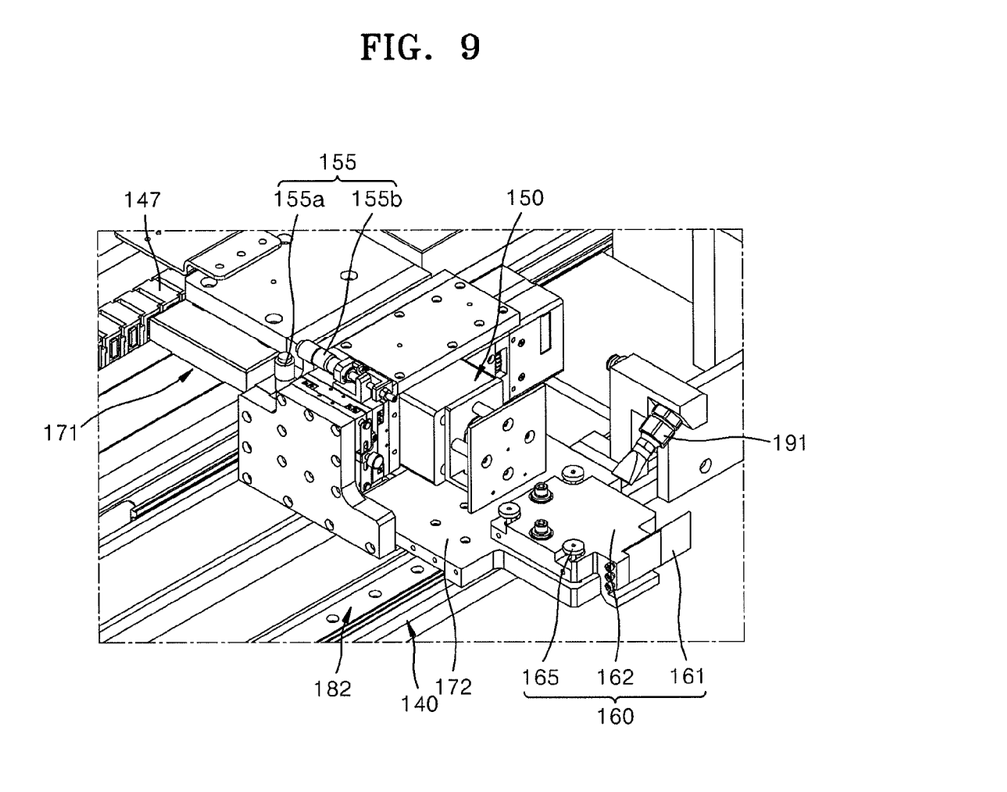
FIG. 9 is a perspective view of an enlargement of a part D of the laser patterning examining apparatus illustrated in FIG. 5.
Figure 10:
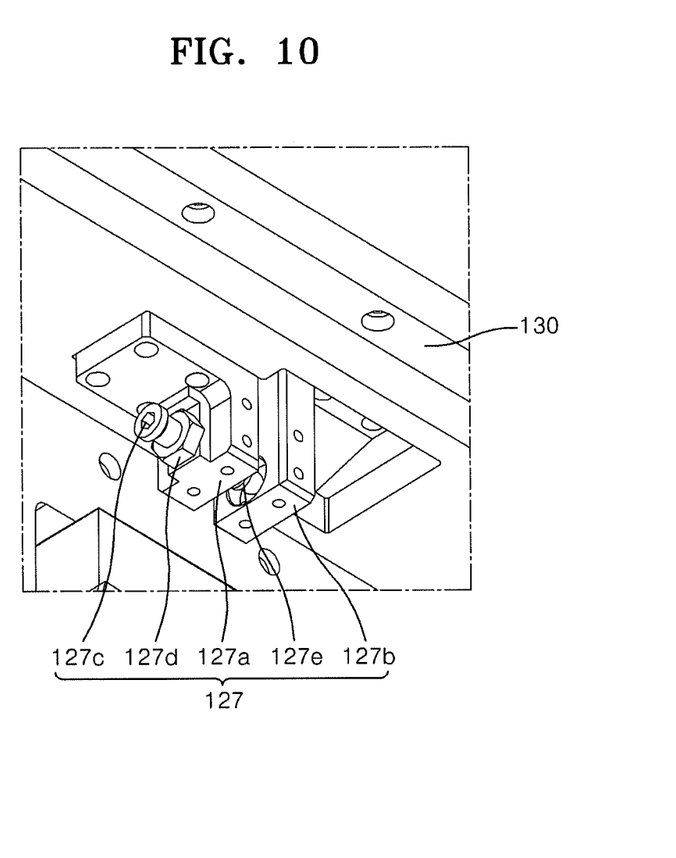
FIG. 10 is a perspective view of a part C of the laser patterning examining apparatus illustrated in FIG. 5.

FIG. 6 is a perspective view that illustrates a direction in which a laser beam proceeds in the laser patterning examining apparatus 100 illustrated in FIG. 3. FIG. 7 is a cross-sectional view of an enlargement of a part A of the laser patterning examining apparatus 100 of FIG. 4. FIG. 8 is a perspective view of an enlargement of a part B of the laser patterning examining apparatus 100 of FIG. 4. FIG. 9 is a perspective view of an enlargement of a part D of the laser patterning examining apparatus 100 of FIG. 5. FIG. 10 is a perspective view of an enlargement of a part C of the laser patterning examining apparatus 100 of FIG. 5.

Referring to FIGS. 6-10, a laser beam emitted from the laser emission unit 195 may be patterned and then proceed. The laser beam emitted from the laser emission unit 195 may proceed toward the prism unit 160.

A first portion 195a of the patterned laser beam may be refracted by the prism 161. A second portion 195b of the patterned laser beam that is not refracted may proceed past the prism 161, i.e., through a region where there is no prism 161.

The second portion 195b that proceeds past the prism 161 may be incident collide with the mirror unit 113, and thus the path of the second portion 195b may be changed. In particular, the second portion 195b may be reflected by the mirror unit 113 toward and be incident on the beam duct 117.

The second portion 195b that proceeds toward the mirror unit 113 may not be reflected by the mirror unit 113, depending upon the location of the mirror unit 113. Reflection of the second portion 195b by the mirror unit 113 may be achieved by moving the mirror unit 113.

In detail, when a force is applied to the mirror unit 113 to move the mirror unit 113, the mirror unit 113 may be moved linearly, i.e., along the z-axis, by the mirror forward-backward movement driving unit 114. At this time, a user may ascertain a movement route of the laser beam with the naked eye or via a special device and then may determine the location of the mirror unit 113.

As described above, the laser beam may enter the beam duct 117 and dissipate via the coolant circulation unit. In detail, a coolant may circulate within the coolant circulation unit to absorb energy emitted from the incident laser beam to thereby dissipate the laser beam.

When the first portion 195a is incident upon the beam profiler 150 via the prism 161 as described above, the beam profiler 150 may detect the pattern of the incident patterned laser beam from the first portion 195a. The pattern detected by the beam profiler 150 may be analyzed and displayed by an external electronic device.

When the beam profiler 150 operates as described above, the location of the beam profiler 150 or the prism unit 160 may be changed. A method of changing the location of the beam profiler 150 or the prism unit 160 will now be described in detail.

First, the location of the beam profiler 150 may be changed using various methods. In detail, the location of the beam profiler 150 may be changed by the driving unit 170. For example, when the actuator 171 operates, the beam profiler 150 may move in the lengthwise direction of the housing 140, together with the actuator 171. The actuator 171 may be operated in response to an external signal.

As described above, as the actuator 171 operates, the beam profiler 150 may make a linear motion along the outer surface of the housing 140. At this time, a user may adjust the actuator 171 so that the beam profiler 150 is located at a place where the first portion 195a refracted by the prism 161 is incident.

When the actuator 171 operates as described above, the connection plate 172 may also make a linear motion together with the actuator 171. At this time, the connection plate 172 may move the prism unit 160. In particular, the connection plate 172 may prevent the prism unit 160 from sagging due to the self-weight of the prism unit 160 during movement, because the connection plate 172 is supported by the second LM guide unit 182.

When setting of the location of the beam profiler 150 is completed as described above, the location of the beam profiler 150 may be more finely set by changing the location of the rotating plate 120 or the housing 140. For example, when the above-described process of setting the location of the beam profiler 150 is completed, the housing 140 may be rotated due to rotation of the rotating plate 120.

The rotation of the rotating plate 120 may be performed via the rotation adjustment units 127 and 128. In detail, the rotating plate 120 may be rotated by individually adjusting the first rotation adjustment unit 127 and the second rotation adjustment unit 128.

In more detail, when a first interval adjustment bolt 127c rotates, the interval between the first support brackets 127a and the first adjustment brackets 127b may be controlled. At this time, if the second rotation adjustment unit 128 is maintained at an initial state, the rotating plate 120 may be rotated due to a relative movement between the first rotation adjustment unit 127 and the second rotation adjustment unit 128. In particular, since the first support bracket 127a and the second support bracket 128a are fixed to the fixing plate 130, the rotating plate 120 may be rotated through the above-described process. Alternatively, the rotating plate 120 may be rotated by individually driving the first rotation adjustment unit 127 and the second rotation adjustment unit 128.

In this case, a first elastic unit 127e may apply a force in a direction in which the first support bracket 127a is separated from the first adjustment bracket 127b, and a second elastic unit (not shown) may apply a force in a direction in which the second support bracket 128a is separated from the second adjustment bracket 128b. Accordingly, the first elastic unit 127e and the second elastic unit may reduce the forces of rotating the second interval adjustment bolt 127d and a second interval adjustment bolt (not shown), when the first support bracket 127a is separated from the first adjustment bracket 127b and when the second support bracket 128a is separated from the second adjustment bracket 128b.

When the rotating plate 120 rotates as described above, the housing 140 may also rotate. In detail, the rotating plate 120 and the housing 140 may rotate together by being connected to each other via the first LM guide unit 181 and the housing front-and-back distance adjustment unit 145.

The housing 140 may also be vertically moved due to a vertical motion of the rotating plate 120 with respect to the fixing plate 130. The housing 140 may be vertically moved by adjusting the second up-and-down distance adjustment unit 125. In particular, since a plurality of the second up-and-down distance adjustment units 125 are included as described above, the interval between the rotating plate 120 and the fixing plate 130 may be controlled by adjusting each of the second up-and-down distance adjustment units 125. However, a method of operating only one second up-and-down distance adjustment unit 125 will now be described in detail for convenience of explanation.

In detail, when the second up-and-down distance adjustment bolt 125a is rotated, the fixing plate 130 may maintain a fixed state, and the rotating plate 120 may move vertically with respect to the fixing plate 130.

In particular, the interval between the rotating plate 120 and the fixing plate 130 may be controlled by rotating the second up-and-down distance adjustment bolt 125a. After the location of the rotating plate 120 is determined by the second up-and-down distance adjustment bolt 125a as described above, the second up-and-down distance adjustment bolt 125a may be fixed via the second fixing bolt 125b. At this time, when the second fixing bolt 125b is rotated, the second fixing nut 125c and the head side of the second fixing bolt 125b may apply a force from both sides of the second up-and-down distance adjustment bolt 125a to fix the second up-and-down distance adjustment bolt 125a.

In addition to rotating or vertically, i.e., along the z-axis, moving the housing 140 as described above, the housing 140 may be moved back and forth. The housing 140 may be moved back and forth, i.e., along the y-axis, via the housing front-and-back distance adjustment unit 145.

In detail, the second fixing bracket 145a may be fixed to the rotating plate 120 as described above. When the third fixing bolt 145b is rotated, the third fixing bolt 145b may apply a force to the housing 140 to move the housing 140 back and forth.

In particular, when the third fixing bolt 145b is rotated as described above, the second up-and-down distance adjustment unit 125 may prevent the rotating plate 120 from moving back and forth on the fixing plate 130.

When the housing 140 moves back and forth as described above, the first LM guide unit 181 may guide the back-and-forth movement of the housing 140. In particular, the first LM guide unit 181 may guide the housing 140 to make a linear motion in a backward-and-forward direction, i.e., along the x-axis.

The locations of the prism unit 160 and the beam profiler 150 may be aligned due to the above-described changes of the locations of the housing 140 and the rotating plate 120, and then may be adjusted finely.

First, in a method of aligning the beam profiler 150, the beam profiler 150 may be moved perpendicular to the driving unit 170 by the first manual stage 155a. The beam profiler 150 may be moved parallel to the driving unit 170 by the second manual stage 155b.

The first manual stage 155a and the second manual stage 155b may be formed as pneumatic cylinders or hydraulic cylinders and may change the location of the beam profiler 150 in response to an external signal.

Alternatively, the first manual stage 155a and the second manual stage 155b may be formed as an adjustment bolt as described above and may rotate to change the location of the beam profiler 150. However, the first manual stage 155a and the second manual stage 155b are not limited to these examples, and examples of the first and second manual stages 155a and 155b may include all apparatuses and devices that move the beam profiler 150 in a direction corresponding to at least one of an up-and-down direction and a back-and-forth direction.

As described above, after the location of the beam profiler 150 is determined, the location of the prism 161 may be changed. In detail, the prism installation unit 162 may be moved perpendicular to the connection plate 172 by the first up-and-down distance adjustment unit 165. In particular, when the first up-and-down distance adjustment unit 165 is rotated, an end of the first up-and-down distance adjustment unit 165 may be continuously inserted into the connection plate 172 or may protrude from the connection plate 172. At this time, the prism installation unit 162 together with the first up-and-down distance adjustment unit 165 may be spaced farther from the connection plate 172 or the distance therebetween may be narrowed.

When the alignment of the beam profiler 150 and the prism 161 is completed as described above, a laser pattern may be radiated and analyzed as described above. During the analysis of the laser pattern, when the locations of the beam profiler 150, the prism 161, the mirror unit 113, and the beam duct 117 are misaligned, they may be aligned by performing at least one of the above-described processes. To align at least one of the locations of the beam profiler 150, the prism 161, the mirror unit 113, and the beam duct 117, the above-described processes may be not only performed in the above-described sequence, but also may be performed in various sequences or simultaneously.

Accordingly, the laser patterning examining apparatus 100 is able to examine a laser beam pattern in a similar situation to when a laser beam pattern is used during an display manufacturing method, by emitting the laser beam from above In addition, the laser patterning examining apparatus 100 is capable of coping with the enlargement of the size of a beam by minimizing distortion of a laser, e.g., by splitting off a portion of the laser beam pattern having a width that can be handled by the beam profiler.

In particular, when examining a laser pattern, the laser patterning examining apparatus 100 may precisely control the locations of the beam profiler 150 and the prism 161 and thus may increase the convenience of a user.

Moreover, since the laser patterning examining apparatus 100 is capable of examining various laser beam patterns, cost and time necessary for laser beam pattern examination may be reduced.

According to embodiments, since the laser patterning examining apparatus is capable of controlling locations of the beam profiler and the prism easily when examining the laser beam patterns, convenience of the user is improved. In addition, laser beams having larger widths may be handled by minimizing distortion of a laser.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A laser patterning examining apparatus, comprising:
a fixing plate;
a rotating plate to move vertically with respect to the fixing plate and to rotate;
a housing connected to the rotating plate;
a laser installed above the fixing plate, the laser to emit a laser beam;
a prism on the housing, the prism refracting a first portion of the laser beam received from the laser and transmitting a second portion of the laser beam; and
a beam profiler on the housing, the beam profiler to analyze the pattern of the first portion refracted by the prism, the beam profiler being rotatable by the rotating plate.

2. The laser patterning examining apparatus of claim 1, further comprising a mount on which the prism is mounted such that the prism it at a predetermined angle with respect to the laser beam such that less than an entirety of the laser beam received from the laser is refracted and output as the first portion.

3. The laser patterning examining apparatus of claim 2, further comprises a first up-and-down distance adjuster coupled to the mount to move the mount perpendicular to the housing.

4. The laser patterning examining apparatus of claim 1, further comprising a mirror below the prism, the mirror reflecting the second portion.

5. The laser patterning examining apparatus of claim 4, further comprising a mirror forward-backward movement driver connected to the mirror to move the mirror back and forth.

6. The laser patterning examining apparatus of claim 4, further comprising a beam duct which dissipates the second portion reflected by the mirror.

7. The laser patterning examining apparatus of claim 6, wherein the beam duct comprises a coolant circulator inside the beam duct to circulate a coolant to dissipate the second portion.

8. The laser patterning examining apparatus of claim 1, further comprising a first linear motion (LM) guide between the rotating plate and the housing.

9. The laser patterning examining apparatus of claim 1, further comprising a second up-and-down distance adjustor between the fixing plate and the rotating plate, to adjust an up-and-down distance between the fixing plate and the rotating plate.

10. The laser patterning examining apparatus of claim 1, further comprising a housing front-and-back distance adjustor between the rotating plate and the housing, to adjust a front-and-back distance between the rotating plate and the housing.

11. The laser patterning examining apparatus of claim 1, further comprising a beam profiler translator is installed to linearly move the beam profiler on the housing.

12. The laser patterning examining apparatus of claim 11, wherein the prism is connected to the beam profiler translator and linearly moves together with the beam profiler.

13. The laser patterning examining apparatus of claim 12, further comprising a second linear motion (LM) guide between the beam profiler translator and the housing, to guide the linear motion of the prism.

14. The laser patterning examining apparatus of claim 11, further comprising a manual stage between the beam profiler translator and the beam profiler, to move the beam profiler up and down and/or back and forth.

15. The laser patterning examining apparatus of claim 14, wherein the manual stage comprises:
a first manual stage to move the beam profiler perpendicular to the beam profiler translator; and
a second manual stage to move the beam profiler parallel to the beam profiler translator.

16. The laser patterning examining apparatus of claim 1, further comprising a rotation adjustor between the fixing plate and the rotating plate, and rotates the rotating plate with respect to the fixing plate.

17. The laser patterning examining apparatus of claim 16, wherein the rotation adjustor comprises:
a support bracket on the fixing plate;
an adjustment bracket which penetrates the fixing plate and is installed on the rotating plate; and
an interval adjustor inserted into the support bracket and the adjustment bracket, to adjust an interval between the support bracket and the adjustment bracket.

18. The laser patterning examining apparatus of claim 1, further comprising a prism cooler separated from the beam profiler by a predetermined distance.

\* \* \* \* \*